US009573673B2

(12) United States Patent
Parker et al.

(10) Patent No.: US 9,573,673 B2
(45) Date of Patent: Feb. 21, 2017

(54) SLAT SUPPORT AND DEPLOYMENT COUPLING

(71) Applicant: Airbus Operations Limited, Bristol (GB)

(72) Inventors: Simon John Parker, Bristol (GB); Eric Peter Wildman, Bristol (GB); Michael John Sykes, Chester (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 348 days.

(21) Appl. No.: 13/960,132

(22) Filed: Aug. 6, 2013

(65) Prior Publication Data

US 2014/0042276 A1     Feb. 13, 2014

(30) Foreign Application Priority Data

Aug. 8, 2012  (GB) .................................. 1214143.8

(51) Int. Cl.
*B64C 9/02*      (2006.01)
*B64C 9/22*      (2006.01)

(52) U.S. Cl.
CPC .. *B64C 9/22* (2013.01); *B64C 9/02* (2013.01)

(58) Field of Classification Search
CPC ............... B64C 9/02; B64C 9/16; B64C 9/22; B64C 9/14; B64C 9/18; B64C 3/50; B64C 3/48; B64C 2009/143

(Continued)

(56) References Cited

U.S. PATENT DOCUMENTS

| 4,405,105 A | * | 9/1983 | Dilmaghani | .............. B64C 9/16 244/213 |
| 4,470,569 A | * | 9/1984 | Shaffer | ..................... B64C 9/22 244/213 |

(Continued)

FOREIGN PATENT DOCUMENTS

| EP | 2272752 A2 | 1/2011 |
| EP | 2390176 A2 | 11/2011 |

(Continued)

OTHER PUBLICATIONS

Search Report for Application No. GB1214143.8, dated Nov. 27, 2012.

(Continued)

*Primary Examiner* — Benjamin P Lee
(74) *Attorney, Agent, or Firm* — Hauptman Ham, LLP

(57) ABSTRACT

A slat support and deployment apparatus comprising a master slat support and deployment assembly and a slave slat support and deployment assembly is disclosed. The master and the slave slat support and deployment assembly each include an arm having a free end attachable to the same slat at spaced locations along its length for deployment and retraction of said slat in a direction generally parallel to a wing in response to simultaneous movement of said arms. The master and the slave slat support assemblies each include a coupling for attaching said free end of each arm to a slat and the coupling that couples the free end of the arm of each slat support and deployment assembly to a slat is configured to allow movement of that slat relative to said free end of said arm of each slat support and deployment assembly during deployment and retraction of said slat.

24 Claims, 11 Drawing Sheets

(58) Field of Classification Search
USPC ...... 244/216, 213, 214, 131, 217, 99.2, 99.3
See application file for complete search history.

(56) References Cited

U.S. PATENT DOCUMENTS

| | | | | |
|---|---|---|---|---|
| 5,651,513 | A * | 7/1997 | Arena | B64C 9/04 244/215 |
| 6,010,097 | A * | 1/2000 | Cox | B64C 9/16 244/216 |
| 8,424,801 | B2 * | 4/2013 | Wildman | B64C 9/02 244/213 |
| 8,474,762 | B2 * | 7/2013 | Peirce | B64C 9/22 244/213 |
| 8,517,314 | B2 * | 8/2013 | Kracke | B64C 9/02 244/214 |
| 2002/0005462 | A1 | 1/2002 | Broadbent | |
| 2005/0178925 | A1 * | 8/2005 | Broadbent | B64C 9/22 244/214 |
| 2011/0006155 | A1 | 1/2011 | Kracke | |
| 2011/0253832 | A1 | 10/2011 | Wildman et al. | |
| 2011/0290946 | A1 | 12/2011 | Peirce | |
| 2012/0011950 | A1 * | 1/2012 | Kracke | B64C 9/22 74/89.23 |
| 2012/0138750 | A1 | 6/2012 | Schlupf et al. | |
| 2012/0211604 | A1 * | 8/2012 | Schlipf | B64C 9/22 244/131 |
| 2013/0334364 | A1 * | 12/2013 | Parker | B64C 9/22 244/99.3 |

FOREIGN PATENT DOCUMENTS

| | | |
|---|---|---|
| EP | 2433863 A2 | 3/2012 |
| GB | 2311969 A | 10/1997 |
| GB | 2362363 A | 11/2001 |
| GB | 2402914 A | 12/2004 |
| WO | 9609955 A1 | 4/1996 |
| WO | 2010108698 A1 | 9/2010 |

OTHER PUBLICATIONS

Further Search Report for Application No. GB1214143.8, dated May 10, 2013.

* cited by examiner

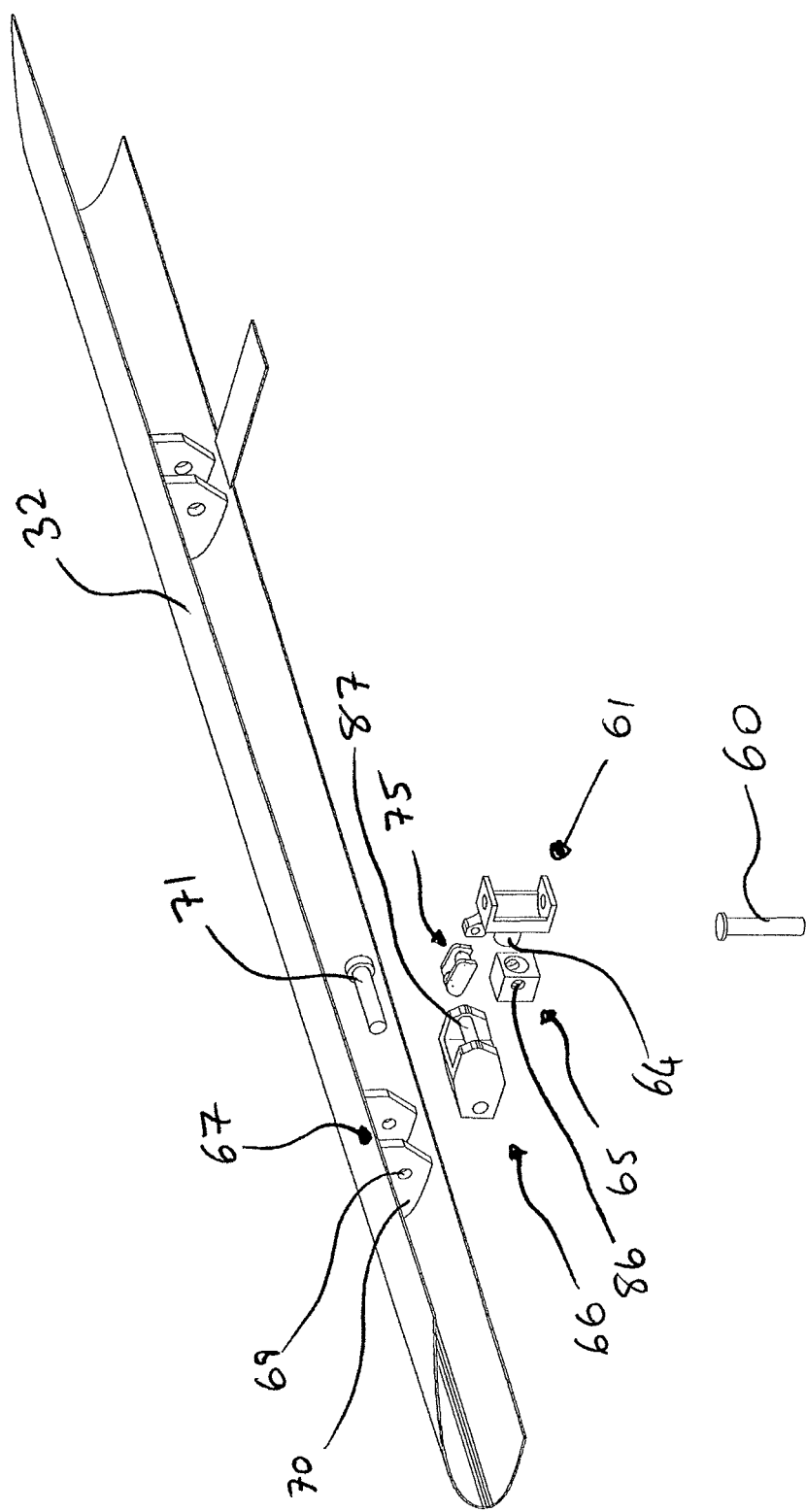

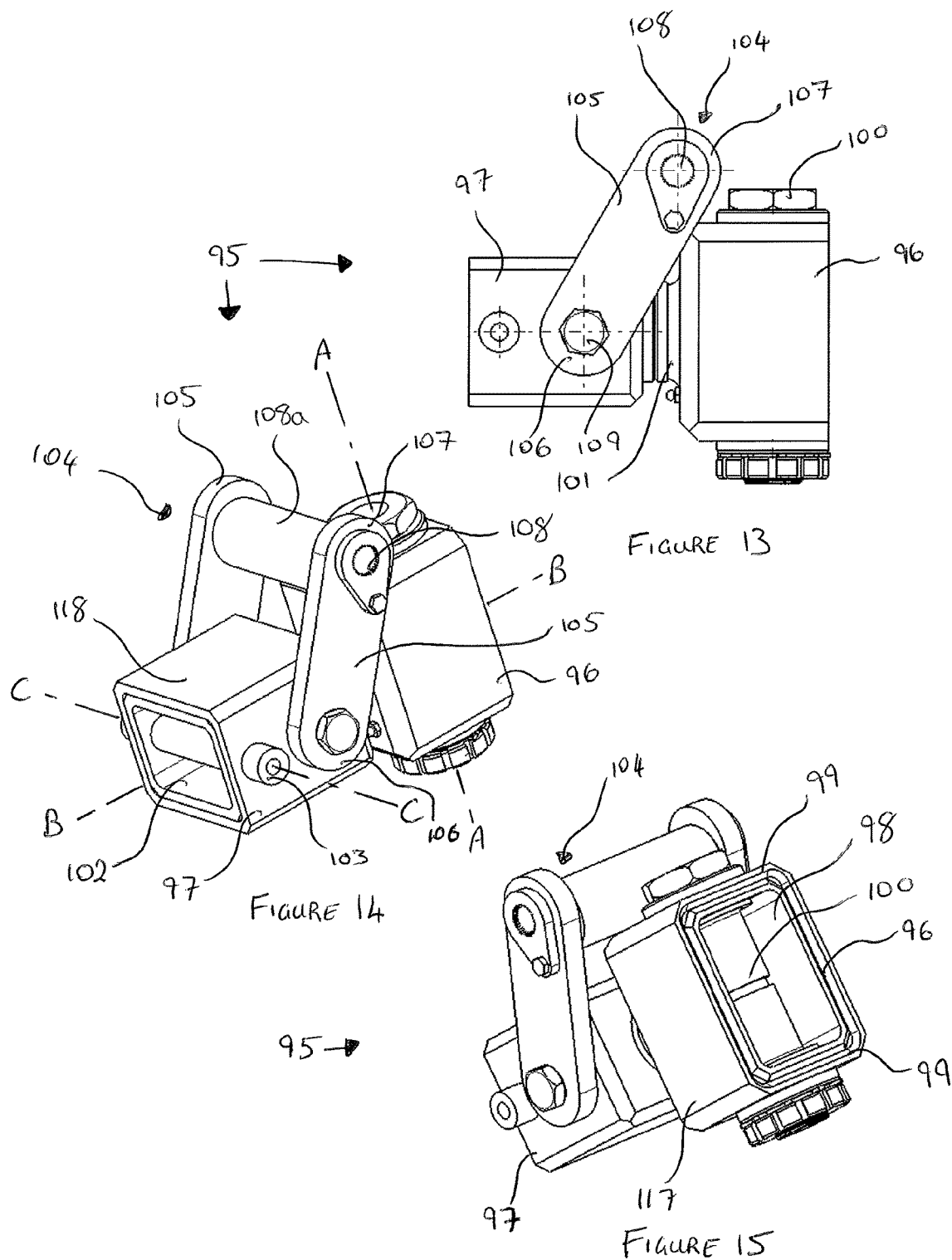

SLAT SUPPORT AND DEPLOYMENT COUPLING

RELATED APPLICATIONS

The present application is based on, and claims priority from, British Application Number 1214143.8, filed Aug. 8, 2012, the disclosure of which is hereby incorporated by reference herein in its entirety.

INTRODUCTION

The present invention relates to a slat support and deployment coupling for coupling a slat support and deployment assembly to a slat on the leading edge of an aircraft wing.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

An assembly is required to support and guide movement of a slat between stowed and deployed positions.

A slat support and deployment assembly has already been described in the Applicant's own earlier application No. EP2433863, the entire content of which is incorporated herein by reference.

The aforementioned application refers to a support assembly for deployment and retraction of an aero surface from an aircraft that includes a guide track, a primary support arm having one end coupled to a carriage mounted on the track such that the primary support arm is rotatable relative to the carriage about multiple axes, and a control arm having one end coupled to the primary support arm and a second end pivotably attachable to a fixed support forming part of the structure of the aircraft. The assembly is configured such that, when the carriage is driven along the guide track, the control arm causes the primary support arm to pivot about said multiple axes to deploy and/or retract an aero surface pivotally attached to an opposite end of the primary support member along an arcuate path.

A more detailed description of the structure and function of the slat deployment assembly will now be described with reference to FIGS. 1 and 2, which have been taken from our earlier application identified above.

Referring primarily to FIG. 1, the assembly 1 comprises a carriage 2 having a body 3 mounted on an elongate track 4. The track 4 is rigidly attached to the wing structure of an aircraft so that it remains stationary relative to a rib 5 forming part of the wing structure. The track 4 has a flange 6 that may be placed against part of the wing structure. Holes (not shown) may extend through the flange 6 to allow bolts or other conventional fasteners to be inserted therethrough to facilitate attachment of the track 4 to the wing structure. The track 4 also has a carriage mounting portion 7 attached to the flange 6 via a thinner, necked region 8.

A rotatable threaded drive shaft 9 extends along the track 4 within a recess 10 in the track 4 and threadingly engages within a drive coupling portion 11 of the carriage 2 that extends into the recess 10 such that, when the threaded shaft 9 rotates, in response to rotation of a drive motor (not shown) drivingly coupled to the shaft 9, the carriage 3 slides along the elongate track 4, its direction depending on the direction of rotation of the shaft 9.

The carriage 3 is supported on the track 4 by a pair of upper and lower bearings (not shown) each inserted into a recess in the carriage 3.

The carriage 3 has spaced parallel wall portions 12 extending from the body 3 between which is mounted an axle 13 having a generally square-shaped cross-section. The axle 13 is mounted to the carriage 3 for rotation about its longitudinal axis 'H' relative to the carriage 3.

A primary support arm 14 has a pair of upper and a pair of lower arm portions or legs 14a, 14b. Each of the upper arm portions 14a and each of the lower arm portions 14b extend from a cylindrical mounting boss 15a, 15b located at one end of the upper and lower arm portions 14a, 14b. The axle 13 locates in the space between these mounting bosses 15a, 15b at the end of each arm portion 14a, 14b and the primary support arm 14 is coupled to the axle 13 by a pin (not shown) that extends through the axle 13 and a hole 16 in each mounting boss 15a, 15b, thereby pivotally connecting the primary support arm 14 to the axle 13 for rotation about an axis 'I', which is at 90 degrees to axis 'H'. The pivotal connection of the axle 13 to the carriage 3 for rotation about axis 'H' and the pivotal connection of the primary support arm 14 to the axle 13 for rotation about axis 'I' together form a universal joint to enable free movement of the primary support arm 14 relative to the carriage 3 as the carriage 3 slides along the guide track 4.

The primary support arm 14 has a cylindrical boss 17 with an aperture 18 at its opposite end to receive a pin (not shown) so as to pivotally couple the primary support arm 14 to a slat about axis J-J, as will become apparent from a description of the preferred embodiments of the present invention.

A secondary support or control arm 18 is coupled to the primary support arm 14 between opposite ends of the primary support arm 14 via a cylindrical barrel rotating in an annulus with a slot with the arm pivoting about the pin to form a universal joint assembly 19. The primary support arm portions 14a, 14b each have an intermediate mounting boss 20a, 20b positioned between each of the upper arm portions 14a and each of the lower arm portions 14b midway along the length of the primary support arm 14. Each of the mounting bosses 14a, 14b are parallel to and spaced from each other. A shaft 21 is connected to and extends between the intermediate mounting bosses 20a, 20b and has a central part-spherical region that forms a male bearing seat or surface. One end of the secondary control arm 18 that connects to the primary support arm 14 has a collar 22 that defines an inner or female part spherical bearing surface that locates around, and mates with, the part spherical bearing surface formed on the shaft 21, so that the control arm 18 can rotate relative to the primary support arm 14 in all directions.

The control arm 18 of the invention comprises support arm portions 23 which diverge at an angle away from the collar 22 and, from each other. Each support arm portion 23 terminates in an annular member 24 that is received within an opening 25 in the rib 5. A pin (not shown) is associated with each annular member 24 and locates in the rib 5 so that it passes through each annular member 24 to facilitate pivotal connection of each annular member 24 to the rib 5 for rotation of the secondary control member 18 about an axis K.

Axes I and J at opposite ends of the primary support member 14 are parallel to each other and remain so during deployment and retraction of the slat. However, it will be noted that axis K extending through the annular members 24 is at an angle relative to axes I and J i.e. it is displaced through a compound angle in both directions so that it is rotated about the longitudinal axis H of the axle 13 as well as being displaced through an angle such that it not perpendicular to the longitudinal axis H. This arrangement produces an arcuate path to the free end of the primary support arm 14 when the carriage 3 slides laterally along the track 4 and the primary support arm 14 rotates about axes H and I.

To deploy a slat coupled to the primary support arm 14, the motor is driven to rotate the threaded shaft 9 so that the carriage 3 moves in a first direction S along the track 4. As the carriage 3 moves, the primary support arm 14 rotates relative to the carriage 3 about the axis I, and also relative to the control arm 18 about the spherical joint 19. At the same time, the axle 13 rotates about its axis H such that the primary support member 14 also moves downwardly, the spherical ball joint 19 between the primary and secondary support members 14, 18 allowing this movement. As a result, the free end of the primary support arm 14 follows an arcuate path in an outward direction away from the track 4, i.e. in the direction of arrow 'T' in FIG. 1.

To retract the slat, the direction of rotation of the threaded shaft 9 is reversed so that the carriage 3 moves along the track 4 in the opposite direction thereby causing the primary support member 14 to follow a return arcuate path back towards the track 4.

It will be appreciated that at least two slat deployment assemblies are required to effectively support and control the deployment of each slat. The slat support assemblies are spaced from each other in a direction along the length of the wing in order to provide adequate support for, and controlled deployment of, the slat along its entire length. FIG. 2 shows such an arrangement, with a slightly modified slat and carriage assembly, each of which are attached to a slat 26. Despite this modification, the principle and operation described with reference to FIG. 1 remains the same.

During assembly, it is important to ensure that when a slat is coupled to the slat support assemblies, the slat is properly aligned with the wing and, in particular, that the upper trailing edge of the slat sits flush with, and against, the leading edge of the wing when the slat is in a closed or withdrawn position, such as during level flight.

It is also apparent that there may be slight differences in the deployment path followed by each slat support assembly during deployment, caused by build tolerances, misalignment or uneven wear between slat support assemblies. This can result in undue stress being placed on the slat if one or more of the slat support assemblies coupled to the same slat is effectively attempting to drive the slat in a slightly different direction or into a different position between its stowed and deployed positions.

The effects of wing bending must also be considered so that no undue stress is placed on the slat during deployment or retraction.

In one embodiment of the present invention, it has been assumed that the slat itself is sufficiently flexible to absorb any misalignments caused by build tolerances or uneven support assembly deployment, as well as withstand any deflection caused by wing bending. This embodiment therefore only provides a slat support assembly coupling that is provided with means to enable fine-adjustment of the position of the slat relative to the slat support assembly and so relative to the wing to which the slat support assembly is mounted, so that the shut-line between the trailing edge of the slat and the leading edge of the wing to which the slat is mounted can be precisely adjusted during assembly to ensure that the upper surface of the slat and the upper surface of the wing lie flush with each other when the slat is in its stowed position.

In another, preferred embodiment of the invention, there is provided a slat support coupling that has a construction that accommodates and adjusts for any misalignments and wing bending deflections, so that the slat itself experiences only minimal stress.

From the foregoing, it will be appreciated that the present invention seeks to overcome or alleviate one or more of the problems referred to above.

SUMMARY OF THE INVENTION

According to an aspect of the present invention, there is provided a slat support and deployment apparatus comprising a master slat support and deployment assembly and a slave slat support and deployment assembly, the master and the slave slat support and deployment assembly each including an arm having a free end attachable to the same slat at spaced locations along its length for deployment and retraction of said slat in a direction generally parallel to a wing in response to simultaneous movement of said arms, the master and the slave slat support assembly each including a coupling for attaching said free end of each arm to a slat, wherein the coupling that couples the free end of the arm of each slat support and deployment assembly to a slat is configured to allow movement of that slat relative to said free end of said arm of each slat support and deployment assembly during deployment and retraction of said slat.

The coupling that couples the free end of the arm of each slat support and deployment assembly to a slat may be configured to allow movement of that slat relative to said free end of said arm of each slat support and deployment assembly in multiple directions.

Said movement in multiple directions may comprise rotation about a first, second and third axes, the first, second and third axes being at right-angles to each other.

The coupling that couples the free end of the arm of the slave slat support and deployment assembly to a slat may also allow rotation of the slat about a fourth axis, relative to the slave slat support and deployment assembly, said fourth axis being parallel to the second axis.

The coupling that couples the free end of the arm of the slave slat support and deployment assembly to a slat may also allow axial movement of the slat relative to the slave slat support and deployment assembly, in a direction along the fourth axis.

The coupling that couples the free end of the arm of the master slat support and deployment assembly to a slat may be configured such that movement of a slat relative to the free end of the master slat support assembly during deployment and retraction of a slat is limited to rotation about a single axis.

A slat attached to the master and slave slat support and deployment assemblies may follow a path that is substantially defined by the path of the free end of the arm of the master slat support and deployment assembly during deployment and retraction of a slat, wherein the coupling that couples the slave slat support assembly to the slat may be configured to allow relative movement between the slat and the free end of the arm of the slave slat support assembly when the path defined by the free end of the arm of the master slat support and deployment assembly differs from a path defined by the free end of the arm of the slave slat support and deployment assembly during deployment and retraction of a slat.

The coupling member that couples the slave slat support assembly to a slat may comprise a first cooperating element pivotally mounted to said free end of the arm of the slave slat support and deployment assembly for rotation of said first cooperating element relative to said free end of the arm about the first axis.

The coupling member that couples the slave slat support assembly to a slat may comprise a second cooperating element having a body, one end of said body being pivotally mountable to a slat for rotation relative thereto about the second axis at right angles to the first axis and in a direction that extends along the length of a slat.

An intermediate element may extend between and couple the first and second cooperating elements together such that the second cooperating element is rotatable relative to the first cooperating element about the third axis and the fourth axis.

The first cooperating element may include a cylindrical mounting hub and the intermediate element may be mounted on said hub for rotation of said intermediate element relative to the first cooperating element about the third axis which is defined by the longitudinal axis of said hub.

The second cooperating element may comprise a yoke formed from two parallel spaced walls extending from an opposite end of the body, the intermediate element being received in said yoke between said walls, said intermediate element being pivotally mounted to said second cooperating element for rotation of the second cooperating element relative to the first cooperating element about said fourth axis.

Said parallel walls may be spaced from each other by a distance which exceeds the width of the intermediate element received between them.

The intermediate element may be mounted to said second cooperating element between said parallel walls such that said first and second cooperating elements are slideable relative to each other in a direction along the fourth axis.

A boss may protrude from each of said parallel walls and the intermediate element may comprise an opening in each surface facing the side walls, a boss being received in each opening to mount the intermediate element to the second cooperating element for rotation about the fourth axis and such that it can slide in a direction along said fourth axis.

The slat support and deployment apparatus may comprise a slave connecting link configured to extend between a slat and the first cooperating element of the coupling of the slave slat support assembly.

The slave connecting link may be configured so that it attaches to a slat and to the first cooperating element via bearing elements such that the slave connecting link and slat are pivotable relative to each other in any direction about one bearing element and, the slave connecting link and the first cooperating element may be pivotable relative to each other in any direction about the other bearing element.

The slave connecting link may comprise a pair of spaced parallel plates having a mounting pin extending therebetween having an axis, said pin including a slat mounting bearing, said bearing having an axis parallel to but offset from the pin mounting axis.

Said bearing may be a spherical bearing.

The bearing element may be rotatable about its mounting axis during assembly so that a slat mounted to said mounting bearing rotates about the second axis to finely adjust the position of a slat during assembly.

The coupling member that couples the free end of the arm of the master slat support assembly to a slat may comprise a first cooperating element pivotally mounted to said free end of said arm for rotation of said first cooperating element relative to said arm about a first axis.

The coupling member that couples the arm of the master slat support assembly to a slat may comprise a second cooperating element pivotally mountable to a slat for rotation relative thereto about a second axis at right angles to the first axis.

The second cooperating element may be mounted to the first cooperating element for rotation about a third axis at right angles to the first axis and the second axis.

The slat support and deployment apparatus may comprise a master connecting link configured to extend between a slat and the second cooperating element.

The master connecting link may comprise a bearing to mount a slat to said master connecting link.

The bearing to which the slat is mountable may have a mounting pin having an axis, said pin including a slat mounting bearing, said bearing having an axis parallel to but offset from the pin mounting axis.

The mounting pin may be rotatable about its axis during assembly so that a slat mounted thereto rotates about its second axis to finely adjust the position of a slat during assembly.

The slat support and deployment apparatus may include a slat coupled to the free end of an arm of a master slat support and deployment assembly and to the free end of an arm of a slave slat support and deployment assembly, said arms of said master and slave slat support and deployment assemblies being movable simultaneously for deployment and retraction of said slat attached thereto.

According to another aspect of the present invention, there is provided an aircraft wing having a rib structure and comprising a slat support and deployment apparatus as described above, said master and slave slat support and deployment assemblies being mounted to said rib structure.

According to another aspect of the present invention, there is provided a slat support and deployment apparatus comprising at least two slat support and deployment assemblies, each slat support and deployment assembly including an arm having a free end attachable to the same slat at spaced locations along its length for deployment and retraction of said slat in a direction generally parallel to a wing in response to simultaneous movement of said arms, each slat support assembly including a coupling for attaching said free end of each arm to a slat, wherein each coupling includes an adjuster to enable fine adjustment of the position of a slat relative to said free ends of each of said arms during assembly.

Each coupling may comprise a first cooperating element pivotally mounted to the free end of each arm for rotation about a first axis and a second cooperating element pivotally mountable to a slat and rotatable about a second axis, the first cooperating element being pivotally mounted to the second cooperating element for rotation about a third axis at right angles to the first and second axes.

The slat support and deployment assembly may comprise a connecting link that extends from the second cooperating element at a location between the point at which the second cooperating element is pivotally mountable to a slat and the point at which the first cooperating element is mounted to the second cooperating element, said connecting link being pivotally attachable to the slat at a location spaced from the pivotal mounting of the second cooperating element to the slat for rotation relative to the slat about a fourth axis parallel to the second axis.

The slat may be coupled to the connecting link via an eccentrically mounted bearing such that, when the bearing is rotated during assembly the slat rotated about the second axis to finely adjust the position of the slat relative to the free end of the slat support and deployment assembly.

DESCRIPTION OF THE DRAWINGS

Embodiments of the invention will now be described, by way of example only, with reference to FIGS. 3 to 8 of the accompanying drawings, in which:

FIG. 11 is A rear perspective view of a pair of assemblies attached to a slat according to an alternative embodiment of the present invention and showing a coupling at the free end of the arm of each slat support and deployment assembly to couple said arms to a slat, each of said couplings allowing fine adjustment of the position of the slat during assembly;

FIG. 13 is a side view of another alternative embodiment of a coupling that is suitable for use as the master coupling of the first embodiment (described with reference to FIGS. 3, 4A, 4B and 6) or as the coupling used in the second embodiment (described with reference to FIG. 12);

FIG. 14 is a first perspective view of the coupling shown in FIG. 13; and FIG. 15 is a second perspective view of the coupling shown in FIG. 14.

DESCRIPTION OF THE PREFERRED EMBODIMENTS

Figure 1:
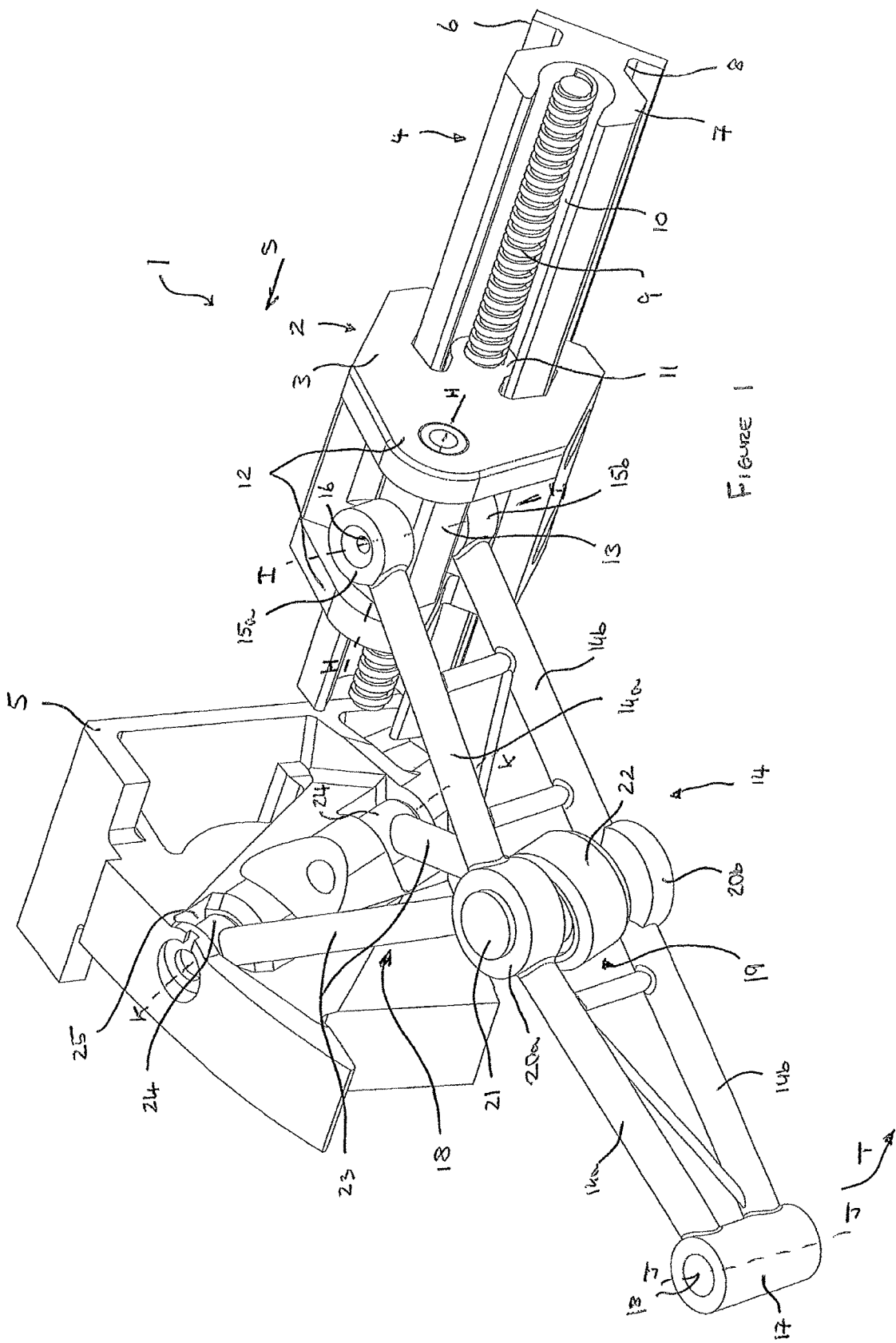
FIG. 1 is a perspective view of a slat support assembly as disclosed in the Applicant's own earlier application referred to above.
Figure 2:
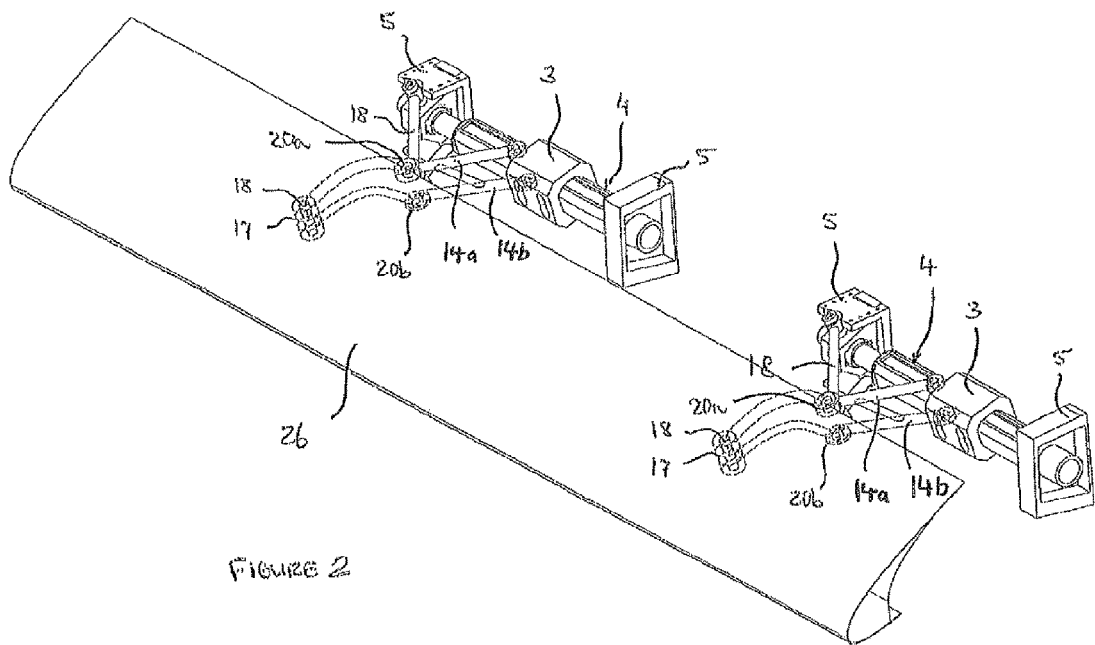
FIG. 2 is a front perspective view of a pair of assemblies attached to a slat that depends from the leading edge of an aircraft wing, as disclosed in the Applicant's own earlier application referred to above.
Figure 3:
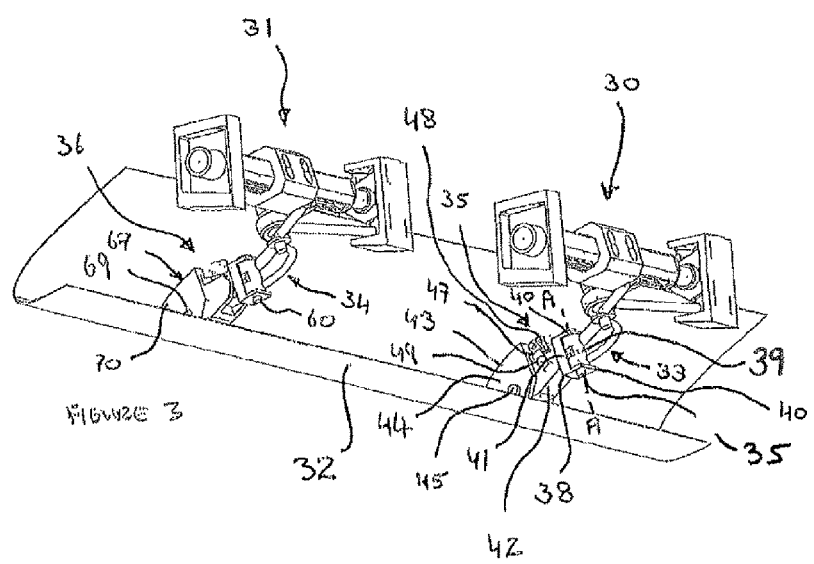
FIG. 3 is a rear perspective view of a pair of assemblies attached to a slat according to the present invention and showing a coupling at the free end of the arm of each slat support and deployment assembly to couple said arms to a slat, one of said slat support assemblies being a master slat support and deployment assembly and the other of said slat support and deployment assemblies being a slave slat support and deployment assembly.

With reference to FIG. 3, there is shown a pair of slat support and deployment assemblies 30, 31 attached to a single slat 32. One of the assemblies 30 forms a 'master' slat support and deployment assembly and the other forms a 'slave' slat support and deployment assembly, for reasons that will become apparent. Each assembly is identical or similar to those described with reference to FIGS. 1 and 2 referred to above. However, the free end of the primary support arm 33, 34 of each slat support assembly is provided with a coupling 35,36 to attach a respective slat support assembly 30,31 to the slat 32. Embodiments of these couplings 35, 36, will now be described in detail.

Figure 4A:
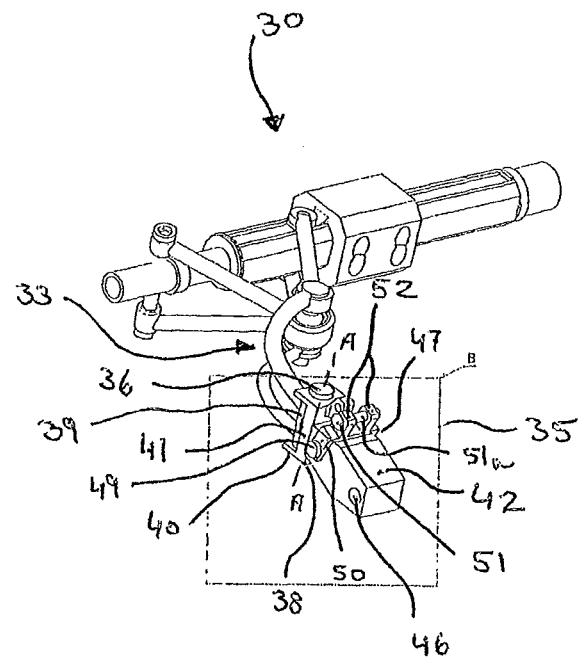
FIG. 4A is a front perspective view of the master slat support and deployment assembly shown in FIG. 3.
Figure 4B:
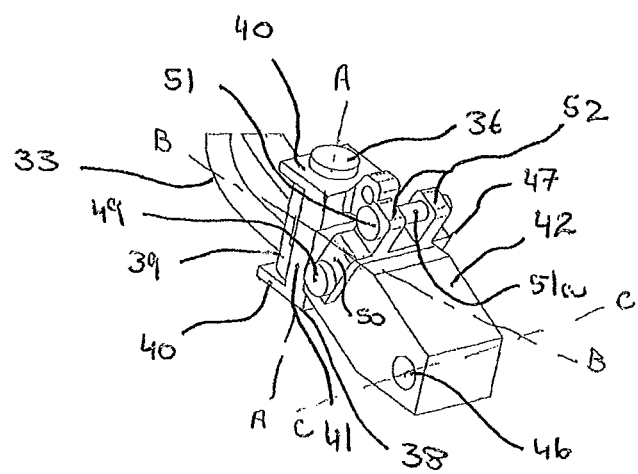
FIG. 4B is an enlarged view of the coupling attached to the free end of the arm of the master slat support and deployment assembly shown in FIG. 4A.
Figure 6:
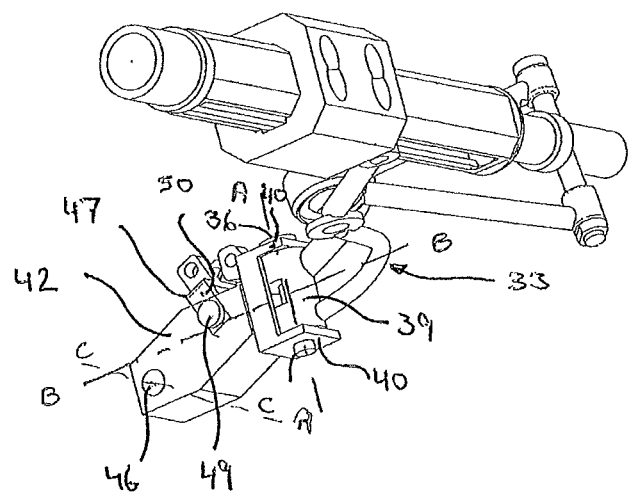
FIG. 6 is a rear perspective view of the master slat support and deployment assembly shown in FIG. 4A.
Figure 7:
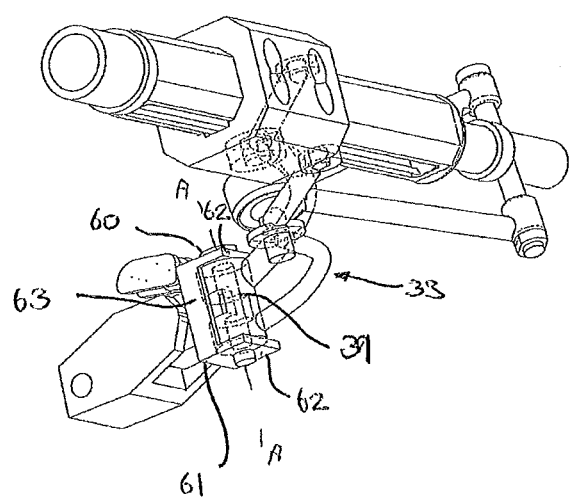
FIG. 7 is a rear perspective view of the slave slat support and deployment assembly shown in FIG. 5A.

A first embodiment of the coupling 35 that is used to couple the master slat support and deployment assembly 30 to the slat 32 is most clearly shown in FIGS. 4A, 4B and 6. The coupling 35 is also shown coupled to a slat 32 in FIG. 3 (the slat support and deployment assembly 30 shown on the right-hand side of the drawing).

A pin 36 pivotally mounts a primary cooperating member or bracket 38 to a cylindrical hub 39 at the free end of the primary control arm 33 for rotation about a first axis A-A. The hub 39 is received between a pair of parallel spaced flanges 40 extending from a central body portion 41 of the primary cooperating member 38.

A cylindrical boss (not shown) extends from the central body portion 41 of the primary cooperating member 38 and is received within a secondary cooperating member or knuckle body 42 so that a secondary cooperating member 42 is rotatable relative to the primary cooperating member 38 about a longitudinal axis B-B (as shown in FIGS. 4B and 6) extending through the cylindrical boss. The cylindrical boss is retained within the secondary cooperating member 42 by an end cap (not shown). The axis B-B is at right angles to the axis A-A.

The secondary cooperating member 42 is received in and pivotally attached to a mount 43 (see FIG. 3) that is formed on and is integral with the underside of the slat 32. In this embodiment, the mount 43 comprises a pair of parallel walls 44 which are spaced by a distance at least slightly greater than the width of the secondary cooperating member 42. The secondary cooperating member 42 is received between the parallel walls 44 and is pivotally attached to the slat 32 by a main slat attachment pin 45 (see FIG. 3) that extends through aligned holes in each wall 44 and through a hole 46 (see FIGS. 4A, 4B and 6) extending through the secondary cooperating member 42. The secondary cooperating member 42 is rotatable relative to the slat 32 about an axis C-C (see FIGS. 4B and 6) coaxial with the longitudinal axis of the pin 45. The axis C-C extends at right angles to axis A-A and B-B.

A master connecting link 47 is coupled to and extends between the secondary cooperating member 42 and a flange 48 extending from the mount 43 spaced from the axis C-C. The master connecting link 47 comprises two integral U-shaped bracket portions extending in opposite directions. The secondary cooperating member 42 is received within the 'mouth' of one 'U' and a pin 49 extends between the arms 50 of the U-shaped bracket and through the secondary cooperating member 42 placed between them to pivotally attach the connecting link 47 to the secondary cooperating member 42.

Likewise, the flange 48 extending from the mount 43 is received within the 'mouth' of the other 'U' of the connecting link 47 and a pin 51 extends between the arms 52 of that U-shaped bracket and through the flange 48 positioned between them, to pivotally connect the connecting link 47 to the flange 48.

The pin 51 that extends through the flange 48 has a mounting axis about which it is rotatable relative to the connecting link 47. However, a portion 51a of the pin 51 that extends between the arms 50 is eccentrically shaped and has an axis, which is parallel to but offset from the mounting axis.

When the pin 51 is positioned so that it extends between the arms 50 and through a flange 48, the pin 51 can be rotated about its mounting axis during assembly so as to precisely control or adjust the position of the slat 32 against the leading edge of an aircraft wing. When the pin 51 is rotated, the eccentric portion 51a pivots about its axis offset from the mounting axis, thereby causing the slat 32 to pivot about axis C-C relative to the secondary cooperating element 42, as the eccentric portion cooperates with the flange 48. Once the desired position of the slat 32 has been achieved, the pin 51 can be tightened so that no further rotation of the pin 51 can take place until further adjustment is necessary.

It will be appreciated that the master coupling is essentially fixed once the slat position adjustment has been carried out so that the slat 32 will follow a path that is directly linked to the path followed by the end of the master slat support and deployment assembly 30.

A first embodiment of the coupling 36 of the slave slat support and deployment assembly 31 will now be described in more detail with reference to FIGS. 3, 5A, 5B, 7, 8, 9, 10 and 11.

As with the master slave slat support and deployment assembly 30, a pin 60 pivotally mounts a primary cooperating member or bracket 61 to a cylindrical hub 39 at the free end of the primary control arm 33 for rotation about a first axis A-A. The hub 39 is received between a pair of parallel spaced flanges 62 extending from a central body portion 63 of the primary cooperating member 61.

A cylindrical boss 64 (see FIGS. 8, 9, 10 and 11) extends from the central body portion 63 of the primary cooperating member 61 and is rotatably mounted within an intermediate cooperating member 65 so that the primary cooperating member 61 and intermediate cooperating member 65 are rotatable relative to each other about a second axis B-B extending through the longitudinal axis of said cylindrical boss 64. The cylindrical boss 64 can be retained within the intermediate cooperating member 65 by end cap (not shown) that is fastened to the end of the boss 64. The second axis B-B is at right angles to the first axis A-A.

A secondary cooperating member 66 is pivotally mounted to a mount 67 extending from and integral with the underside of the slat 32 in the same way as described with reference to the master slat support and deployment assembly. In this embodiment, the secondary cooperating member 66 has a hole 68 that is aligned with a hole 69 in spaced parallel walls 70 of the mount 67 and a slat mounting pin 71 (see FIG. 8) extends through said holes 68, 69 to couple the slat 32 to one end of the secondary cooperating member 66 for rotation about a third axis C-C, at right angles to the first and second axes, A-A and B-B, respectively.

The opposite end of the secondary cooperating member 66 has two spaced parallel wall portions 72 to define a space or yoke 73 (see FIG. 10) therebetween, and the intermediate cooperating member 65 is received within said yoke 73. The width of the intermediate cooperating member 65 is less than the width of the space between said parallel wall portions 72 so that the intermediate cooperating member 65 is spaced from the each of the wall portions 72 within the yoke 73, for reasons that will become apparent.

Figure 5A:
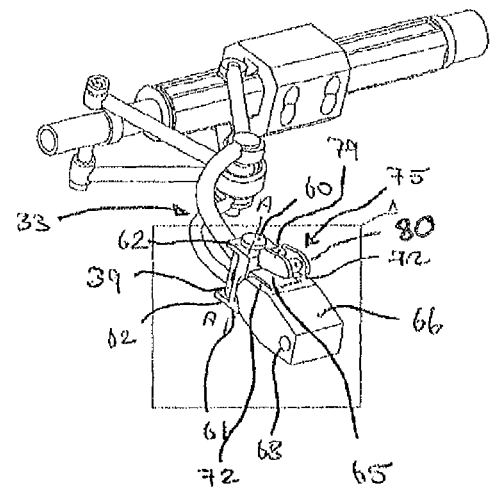
FIG. 5A is a front perspective view of the slave slat support and deployment assembly shown in FIG. 3.
Figure 5B:
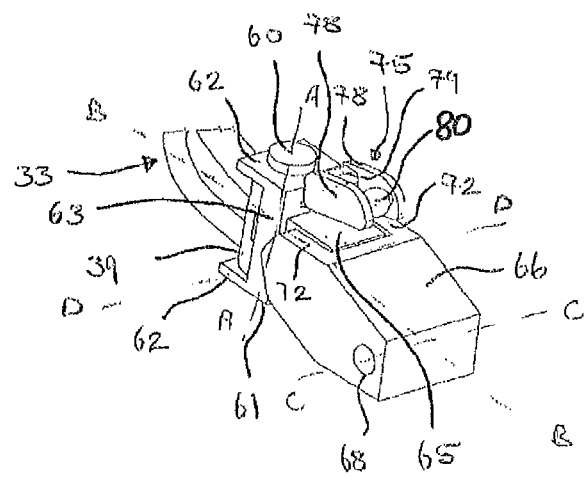
FIG. 5B is an enlarged view of the coupling attached to the free end of the arm of the slave slat support and deployment assembly shown in FIG. 5A.
Figure 8:
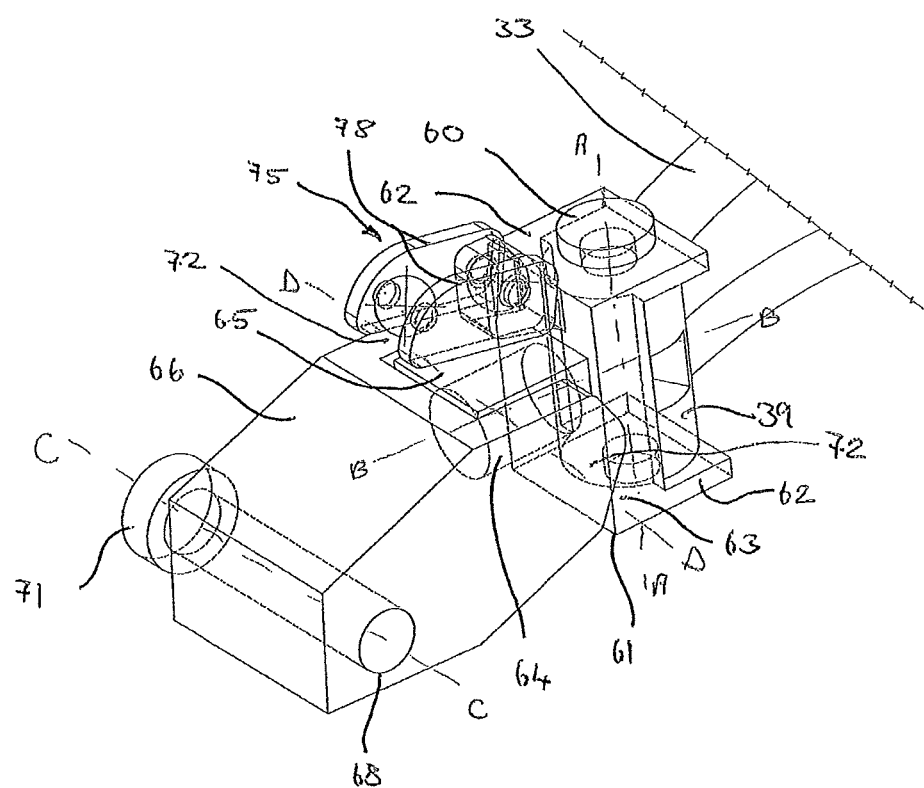
FIG. 8 is an enlarged perspective view of the coupling attached to the free end of the arm of the slave slat support assembly, showing some hidden detail aspects in dashed lines.
Figure 9:
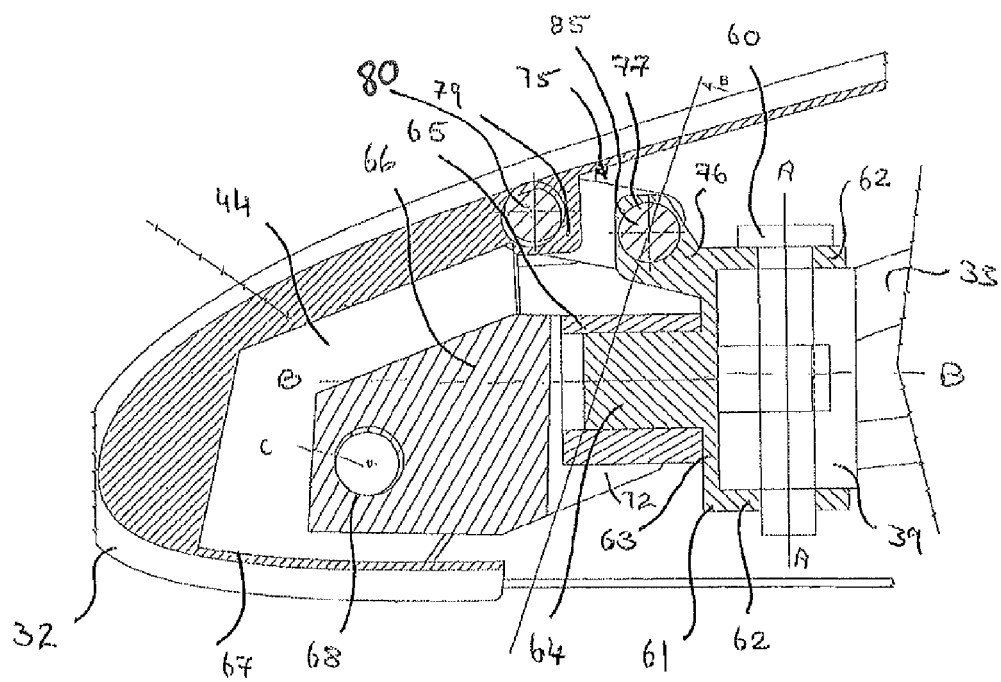
FIG. 9 is a side sectional elevation through the coupling attached to the free end of the arm of the slave slat support assembly, with a slat mounted thereto.
Figure 10:
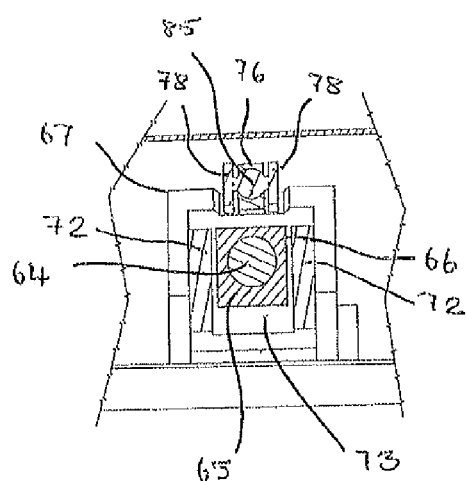
FIG. 10 is a cross-sectional view taken along the line B-B in FIG. 9.

Opposite surfaces of the intermediate cooperating member 65 facing the parallel wall portions 72 have holes (not shown) and a boss 87 extends from each parallel wall portion 72 in a direction towards the other parallel wall portion 72 which are rotatably received within a corresponding hole 86 in opposing surfaces of the intermediate cooperating member 65, so as to rotatably couple the secondary cooperating member 66 to the intermediate cooperating member 65 for relative rotation about an axis D-D (see FIGS. 5B and 8). Axis D-D is parallel to axis C-C, but at right angles to axes A-A and B-B.

As there is a space between the intermediate cooperating member 65 and the parallel wall portions 72, the secondary cooperating member 66 and the intermediate member 65 can slide relative to each other in a direction along the axis D-D. The cooperating holes 86 and bosses 87 that couple the secondary cooperating member 66 to the intermediate cooperating member 65 are sized so that the intermediate cooperating member 65 and the secondary cooperating member will remain coupled together throughout the entire range of sliding movement relative to each other.

A slave connecting link 75 is coupled to and extends between the primary cooperating member 61 and a flange 79 (see FIG. 9) on the slat 32 that is spaced from axis C-C. The primary cooperating member 61 has a web 76 (see FIGS. 9 and 10) protruding upwardly from its body portion 63 in which an aperture 77 is formed. The connecting link 75 comprises a pair of spaced parallel plates 78 and a spherical bearing 85 is mounted to and extends between each of the plates 78 at one end and locates in the aperture 77 in the web 76 so as to mount the connecting link 75 to the primary cooperating member 61 for rotation of the connecting link 75 relative to the primary cooperating member 61 in any direction.

The opposite end of the connecting link 75 is mounted to the flange 79, which is received between each of the plates 78. A mounting pin 80 is received in and extends between each plate 78 for rotation about a mounting axis during assembly. The mounting pin 80 has an eccentric portion extending between each plate 78 so that, when the mounting pin 80 is rotated about its mounting axis, the eccentric portion rotates about its axis, offset from the mounting axis. As a result of cooperation of the eccentric portion with the flange 79, the slat 32 is caused to pivot about axis C-C when the pin 80 is rotated, to enable fine adjustment of the position of the slat 32 relative to the leading edge of the aircraft wing during assembly or servicing.

During deployment of a slat 32, the master and slave slat support assemblies 30,31 are both driven simultaneously and the slat 32 follows the path defined by the master slat support and deployment assembly 30.

The slave slat support and deployment assembly 31 is provided with a coupling 36, as described above, which accommodates any wing bending, misalignments and any differences in the deployment path followed by the slave slat support assembly 31 relative to the primary slat support assembly 30. In particular, the slat 32 can move, together with the secondary cooperating element 66, laterally along the fourth axis D-D, due to the spacing and coupling between the secondary cooperating element 66 and the intermediate cooperating element 65. This lateral movement is also permitted by the spherical bearings that couple the connecting link 75 to the primary cooperating element 61 and to the flange 79 on the slat 32.

It will also be appreciated that the coupling 36 that couples the slat 32 to the slave slat support and deployment assembly 31 also allows pivotal movement of the secondary cooperating element 66 relative to the intermediate cooperating element 65 about axis D-D. Furthermore, the intermediate cooperating element 65 is also rotatable relative to the primary cooperating element 61 about the second axis B-B. The spherical bearings coupling the connecting link 75 to each of the primary cooperating element 61 and the flange 79 on the slat 32 also permitting pivotal movement of the secondary cooperating element 66 relative to the primary cooperating element 61 so that any misalignment between the master and slave slat support assemblies 30, 31 can be absorbed as a result of this movement and no undue stress is placed on the slat 32.

It will be appreciated that the relative rotation or movement between components described above may be limited. However, it will be noted that wing bending, misalignment and irregular deployment of the slat support and deployment assemblies will only cause very small differences that can easily be accommodated by the coupling 36 of the slave slat support assembly 31, which effectively acts as a type of universal joint between the slat and the slave slat support and deployment assembly that takes up any small misalignments.

A second embodiment of the invention will now be described with reference to FIGS. 12A and 12B. In this embodiment, the slave coupling allows the same movement as the master coupling; rotation about the three axes A-A, B-B and C-C. However, this embodiment of the coupling differs from the previous embodiment because it does not facilitate the fourth axis D-D. Using the same coupling for both the master and the slave assemblies requires fewer unique components, reducing costs and simplifying maintenance.

The slave coupling of this embodiment does not allow the sideways sliding movement that was described in the first embodiment. Therefore, the slat will deform during deployment and retraction because of assembly misalignments or imperfect synchronisation between the master and slave slat support and deployment assemblies and actuators. However, the coupling does allow for adjustments of the slat position relative to the slat actuators at both the master and slave couplings so the amount of deformation in the slat will be small and the stresses induced in the slat should be negligible.

Figure 12A:
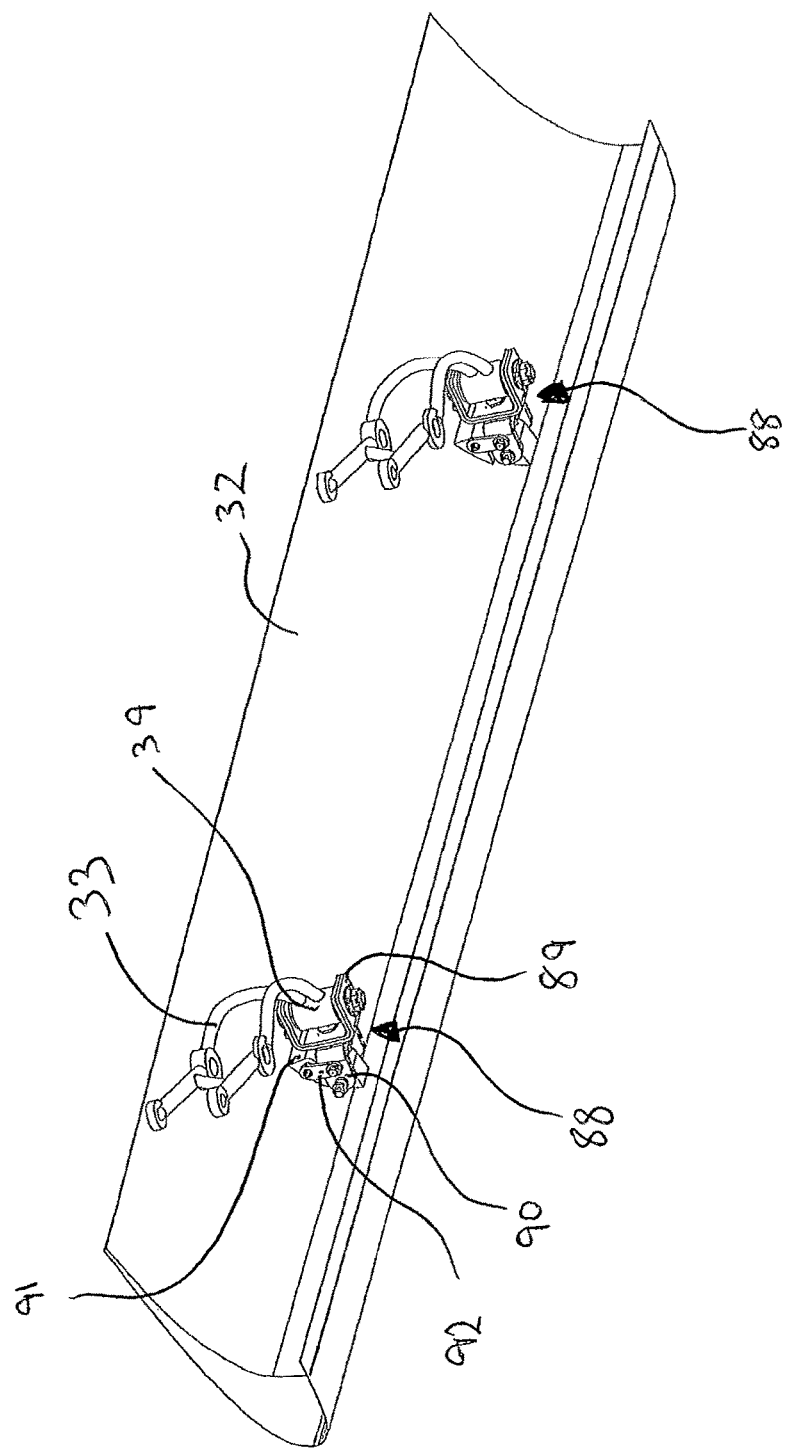
FIG. 12A is a rear perspective view of a pair of assemblies attached to a slat that depends from the leading edge of an aircraft wing, according to another embodiment of the invention.

FIG. 12A shows two couplings 88 connecting the slat 32 with the primary support arms 33 of the master and slave slat support and deployment assemblies. Similar to the master coupling 35 previously described before, the couplings 88 comprise a primary cooperating member 89 that pivotally attaches to the cylindrical hub 39 of the primary support arm 33 about axis A-A. The couplings 88 also comprise a secondary cooperating member 90 that pivotally attaches to the slat 32, via a mount 91, about axis C-C.

Figure 12B:
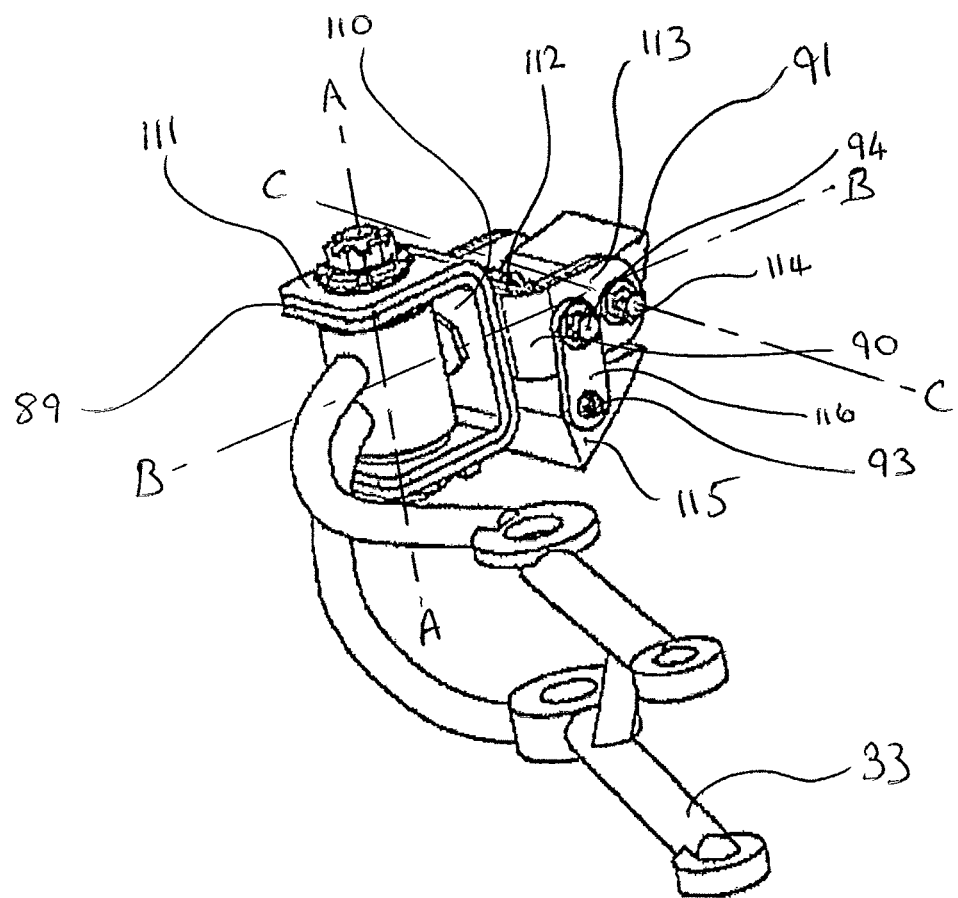
FIG. 12B is a perspective view of one of the couplings shown in FIG. 12A.

FIG. 12B shows an enlarged view of the coupling 88 of FIG. 12A. In this embodiment, the primary cooperating member 89 comprises a 'U' shaped bracket with a main body portion 110 and two spaced parallel flanges 111. The secondary cooperating member 90 also comprises a 'U' shaped bracket with a main body portion 112 and two spaced parallel flanges 113.

As before, the main body portion 112 of the secondary cooperating member 90 comprises a hole (not shown) for receiving a cylindrical boss (not shown) extending from the main body 110 of the primary cooperating member 89, pivotally connecting the primary and secondary cooperating members 89, 90 about axis B-B. A mount 91 is attached to, or integrally formed with, the slat 32 and comprises a block with a hole extending through it defining axis C-C. The two spaced parallel flanges 113 of the secondary cooperating member 90 are spaced slightly further apart than the width of the mount 91 and each flange 113 comprises a hole so that the mount can be received between the spaced parallel flanges 113 and a slat mounting pin 114 positioned through the aligned holes to pivotally connect the secondary cooperating member 90 to the slat 32 about axis C-C, which is perpendicular to axes A-A and B-B.

Similar to the connecting link previously described for the master coupling 35 of the first embodiment, a connecting link 92 joins the secondary cooperating member 90 to a second portion of the mount 115. The connecting link 92 is coupled to and extends between the secondary cooperating member 91 and the mount 115, spaced from the axis C-C. The connecting link 92 comprises two spaced parallel plates 116. Each plate has a first end that is pivotally connected to the secondary cooperating member 90 via a pin 93 along an axis that is parallel to and spaced from C-C. Each plate also comprises a second end that is pivotally attached to the mount 115 via a pin 94 along a mounting axis that is parallel to and spaced from C-C.

As with the connecting link 92 of the couplings previously described, the pin 94 that extends through the connecting link 92 and the mount 91 has a mounting axis about which it is rotatable relative to the mount 91. A portion of the pin 94 located between the spaced parallel plates 116 is eccentrically shaped, with an axis that is parallel to and spaced from the mounting axis of the pin 94. Therefore, the pin 94 rotates relative to the connecting link 92 about an axis that is spaced from and parallel to the mounting axis.

The pin 94 can be rotated about its mounting axis during assembly so as to precisely control or adjust the position of the slat 32 against the leading edge of an aircraft wing. When the pin 94 is rotated, the eccentric portion pivots about its axis offset from the mounting axis, thereby causing the slat 32 to pivot about axis C-C relative to the secondary cooperating element 90. Once the desired position of the slat 32 has been achieved, the pin 94 can be tightened so that no further rotation of the pin can take place until further adjustment is necessary.

FIGS. 13, 14 and 15 show an alternative embodiment of a coupling 95 that is suitable for use as the master coupling of the first embodiment (described with reference to FIGS. 3, 4A, 4B and 6) or as the coupling used in the second embodiment (described with reference to FIG. 12). This coupling 95 allows rotation about axes A-A, B-B, and C-C as previously described, and has a connecting link for making adjustments, but does not allow the sliding relationship of the slave coupling of the first embodiment.

As before, the coupling 95 shown in FIGS. 13, 14 and 15 comprises a primary cooperating member 96 and a secondary cooperating member 97. The primary cooperating member 96 comprises a main body portion 117 formed of a hollow box with one open side 98 for receiving the cylindrical hub of the primary support arm, similarly to described with previous embodiments. Two spaced parallel walls 99 of the box section 117 have aligned holes for receiving a pin 100 that passes through each hole and through the bore of the cylindrical hub of the primary support arm to pivotally mount the primary cooperating member 96 to the primary support arm about axis A-A.

The primary cooperating member 96 also comprises a cylindrical boss 101 (see FIG. 13) that extends from the main body portion 117 in a direction perpendicular to axis A-A and is received in a bore (not shown) in the secondary cooperating member 97, to pivotally attach the primary and secondary cooperating members 96, 97 about axis B-B.

The secondary cooperating member 97 also comprises a hollow box section 118 with an open face 102—the face opposite the side with the bore for receiving the cylindrical boss 101. As before, the secondary cooperating member 97 is pivotally attached to a mount in the slat. The mount (not shown) comprises two spaced parallel plates with aligned holes and the secondary cooperating member 97 is received between the plates and a pin 103 is positioned through both plates and through a hole in the secondary cooperating member 97 to pivotally mount the coupling 95 to the slat about axis C-C.

For adjusting the position of the slat relative to the position of the slat actuator, a connecting link 104 extends between the secondary cooperating member 97 and the mount on the slat. This is necessary to be able to align the slat with the wing surface when the slat is in a retracted position and is important for limiting the effects of assembly misalignments between the master and slave slat support and deployment assemblies.

In this embodiment, the connecting link 104 comprises two spaced parallel plates 105, each comprising a first end 106 and a second end 107, with pins 109, 108 extending between the plates 105 at each end 106, 107 respectively. The first pin 109 at the first end 106 of the connecting link 104 is pivotally attached to the secondary cooperating member 97 through a hole that extends through the secondary cooperating member 97 along an axis parallel to and spaced from axis C-C. The second pin 108 at the second end 107 of the connecting link 104 is pivotally attached to a flange with an aperture that extends from the slat mount (not shown). The second pin 108 pivots about the connecting link 104 on a mounting axis, which is parallel to and spaced from axis C-C.

The second pin 108, that pivotally attaches the connecting link 104 to the slat mount, comprises an eccentric portion 108a positioned in the portion of the pin 108 that is between the parallel spaced plates 105 and within the aperture of the flange. The eccentric portion 108a has an axis that is parallel to and spaced from the mounting axis of the pin 108. When the pin 108 is rotated within the connecting link 104 the eccentric portion 108a cooperates with the aperture of the flange to rotate the slat about axis C-C. In this way, the position of the slat relative to each support and deployment assembly can be adjusted.

Although the embodiments of the invention are primarily intended for use in controlling the deployment and retraction of a slat or flap from an aircraft wing, it could also be used to control any other aero surfaces including spoilers. It is also envisaged that it could be used to control, for example, the opening and closing of landing gear doors.

The invention has been described with reference to two embodiments in which there is a single slave slat support and deployment assembly. However, it will be appreciated that two or more slave slat support assemblies may be used in the deployment of a single slat, together with a single master slat support and deployment assembly.

It will be appreciated that the foregoing description is given by way of example only and that modifications may be made to the slat support assembly of the present invention without departing from the scope of the appended claims.

The invention claimed is:

1. A slat support and deployment apparatus comprising a master slat support and deployment assembly and a slave slat support and deployment assembly, the master and the slave slat support and deployment assembly each including an arm having a free end attachable to the same slat at spaced locations along its length for deployment and retraction of said slat in a direction generally parallel to a wing in response to simultaneous movement of said arms, the master and the slave slat support assembly each including a coupling for attaching said free end of each arm to a slat, wherein the coupling that couples the free end of the arm of each slat support and deployment assembly to a slat is configured to allow rotation of that slat relative to said free end of said arm of each slat support and deployment assembly during deployment and retraction of said slat, said rotation being about first, second and third axes extending at right angles to each other, and about a fourth axis, said fourth axis being parallel to the third axis.

2. A slat support and deployment apparatus according to claim 1, wherein the coupling that couples the free end of the arm of the slave slat support and deployment assembly to a slat also allows axial movement of the slat relative to the slave slat support and deployment assembly, in a direction along the fourth axis.

3. A slat support and deployment apparatus according to claim 1, wherein the coupling that couples the slave slat support assembly to a slat comprises a first cooperating element pivotally mounted to said free end of the arm of the slave slat support and deployment assembly for rotation of said first cooperating element relative to said free end of the arm about the first axis.

4. A slat support and deployment apparatus according to claim 3, wherein the coupling that couples the slave slat support assembly to a slat comprises a second cooperating element having a body, one end of said body being pivotally mountable to a slat for rotation relative thereto about the second axis at right angles to the first axis and in a direction that extends along the length of a slat.

5. A slat support and deployment apparatus according to claim 3, comprising a slave connecting link configured to extend between a slat and the first cooperating element of the coupling of the slave slat support assembly.

6. A slat support and deployment apparatus according to claim 1, including a slat coupled to the free end of an arm of a master slat support and deployment assembly and to the free end of an arm of a slave slat support and deployment assembly, said arms of said master and slave slat support and deployment assemblies being movable simultaneously for deployment and retraction of said slat attached thereto.

7. An aircraft wing having a rib structure and comprising a slat support and deployment apparatus according to claim 6, said master and slave slat support and deployment assemblies being mounted to said rib structure.

8. A slat support and deployment apparatus comprising a master slat support and deployment assembly and a slave slat support and deployment assembly, the master and the slave slat support and deployment assembly each including an arm having a free end attachable to the same slat at spaced locations along its length for deployment and retraction of said slat in a direction generally parallel to a wing in response to simultaneous movement of said arms, the master and the slave slat support assembly each including a coupling for attaching said free end of each arm to a slat, wherein the coupling that couples the free end of the arm of each slat support and deployment assembly to a slat is configured to allow rotation of that slat relative to said free end of said arm of each slat support and deployment assembly during deployment and retraction of said slat, wherein the coupling that couples the free end of the arm of the slave slat support and deployment assembly allows rotation of a slat about first, second and third axes extending at right angles to each other, and wherein the coupling that couples the free end of the arm of the master slat support and deployment assembly to a slat is configured such that movement of a slat relative to the free end of the master slat support assembly during deployment and retraction of a slat is limited to rotation about the first axis.

9. A slat support and deployment apparatus according to claim 8, wherein a slat attached to the master and slave slat support and deployment assemblies follows a path that is substantially defined by the path of the free end of the arm of the master slat support and deployment assembly during deployment and retraction of a slat, wherein the coupling that couples the slave slat support assembly to the slat is configured to allow relative movement between the slat and the free end of the arm of the slave slat support assembly when the path defined by the free end of the arm of the master slat support and deployment assembly differs from a path defined by the free end of the arm of the slave slat support and deployment assembly during deployment and retraction of a slat.

10. A slat support and deployment apparatus according to claim 8, wherein the coupling that couples the free end of the arm of the master slat support assembly to a slat comprises a first cooperating element pivotally mounted to said free end of said arm for rotation of said first cooperating element relative to said arm about said first axis.

11. A slat support and deployment apparatus according to claim 10, comprising a master connecting link configured to extend between a slat and the second cooperating element.

12. A slat support and deployment apparatus according to claim 11, wherein the master connecting link comprises a bearing to mount a slat to said master connecting link.

13. A slat support and deployment apparatus according to claim 12, wherein the bearing to which the slat is mountable has a mounting pin having an axis, said pin including a slat mounting bearing, said bearing having an axis parallel to but offset from the pin mounting axis.

14. A slat support and deployment apparatus according to claim 13, wherein the mounting pin is rotatable about its axis during assembly so that a slat mounted thereto rotates about its second axis to finely adjust the position of a slat during assembly.

15. A slat support and deployment apparatus comprising a master slat support and deployment assembly and a slave slat support and deployment assembly, the master and the slave slat support and deployment assembly each including an arm having a free end attachable to the same slat at spaced locations along its length for deployment and retraction of said slat in a direction generally parallel to a wing in response to simultaneous movement of said arms, the master and the slave slat support assembly each including a coupling for attaching said free end of each arm to a slat, wherein the coupling that couples the free end of the arm of each slat support and deployment assembly to a slat is configured to allow rotation of that slat relative to said free end of said arm of each slat support and deployment assembly during deployment and retraction of said slat about first, second and third axes extending at right angles to each other, wherein the coupling that couples the slave slat support assembly to a slat comprises a first cooperating element pivotally mounted to said free end of the arm of the slave slat support and deployment assembly for rotation of said first cooperating element relative to said free end of the arm about the first axis, and a second cooperating element having a body, one end of said body being pivotally mountable to a slat for rotation relative thereto about the third axis at right angles to the first axis and in a direction that extends along the length of a slat, wherein an intermediate element extends between and couples the first and second cooperating elements together such that the second cooperating element is rotatable relative to the first cooperating element about the second axis, and about a fourth axis that extends parallel to the third axis.

16. A slat support and deployment apparatus according to claim 15, wherein the first cooperating element includes a cylindrical mounting hub and the intermediate element is mounted on said hub for rotation of said intermediate element relative to the first cooperating element about the second axis which is defined by the longitudinal axis of said hub.

17. A slat support and deployment apparatus according to claim 16, wherein the second cooperating element comprises a yoke formed from two parallel spaced walls extending from an opposite end of the body, the intermediate element being received in said yoke between said walls, said intermediate element being pivotally mounted to said second cooperating element for rotation of the second cooperating element relative to the first cooperating element about said fourth axis.

18. A slat support and deployment apparatus according to claim 17, wherein said parallel walls are spaced from each other by a distance which exceeds the width of the intermediate element received between them.

19. A slat support and deployment apparatus according to claim 18, wherein the intermediate element is mounted to said second cooperating element between said parallel walls such that said first and second cooperating elements are slideable relative to each other in a direction along the fourth axis.

20. A slat support and deployment apparatus according to claim 19, wherein a boss protrudes from each of said parallel walls and the intermediate element comprises an opening in each surface facing the side walls, a boss being received in each opening to mount the intermediate element to the second cooperating element for rotation about the fourth axis and such that it can slide in a direction along said fourth axis.

21. A slat support and deployment apparatus comprising a master slat support and deployment assembly and a slave slat support and deployment assembly, the master and the slave slat support and deployment assembly each including an arm having a free end attachable to the same slat at spaced locations along its length for deployment and retraction of said slat in a direction generally parallel to a wing in response to simultaneous movement of said arms, the master and the slave slat support assembly each including a coupling for attaching said free end of each arm to a slat, wherein the coupling that couples the free end of the arm of each slat support and deployment assembly to a slat is configured to allow rotation of that slat relative to said free end of said arm of each slat support and deployment assembly during deployment and retraction of said slat, said rotation being about first, second and third axes, each of said first, second and third axes being at right angles to each other, wherein the coupling that couples the slave slat support assembly to a slat comprises a first cooperating element pivotally mounted to said free end of the arm of the slave slat support and deployment assembly for rotation of said first cooperating element relative to said free end of the arm about the first axis, the slat support and deployment apparatus further comprising a slave connecting link configured to extend between a slat and the first cooperating element of the coupling of the slave slat support assembly, wherein the slave connecting link is configured so that it attaches to a slat via a first bearing element and to the first cooperating element via a second bearing element such that the slave connecting link and slat are pivotable relative to each other about said first bearing element and, the slave connecting link and the first cooperating element are pivotable relative to each other about the second bearing element.

22. A slat support and deployment apparatus according to claim 21, wherein the slave connecting link comprises a pair of spaced parallel plates having a mounting pin extending therebetween having an axis, said pin including a slat mounting bearing, said bearing having an axis parallel to but offset from the pin mounting axis.

23. A slat support and deployment apparatus according to claim 22, wherein said bearing is a spherical bearing.

24. A slat support and deployment apparatus according to claim 23, wherein the bearing element is rotatable about its mounting axis during assembly so that a slat mounted to said mounting bearing rotates about the second axis to finely adjust the position of a slat during assembly.

* * * * *